(12) United States Patent
Womann et al.

(10) Patent No.: US 9,163,565 B2
(45) Date of Patent: Oct. 20, 2015

(54) VALVE FLAP DEVICE

(75) Inventors: Marcel Womann, Neustadt an der Weinstrasse (DE); Marc Sommerfeld, Birkweiler (DE); Rico Weinert, Gommersheim (DE); Alexander Schinko, Tübingen (DE); Christoph Schneider, Leinsweiler (DE)

(73) Assignee: TENNECO GMBH, Edenkoben (DE)

( * ) Notice: Subject to any disclaimer, the term of this patent is extended or adjusted under 35 U.S.C. 154(b) by 1050 days.

(21) Appl. No.: 13/068,722

(22) Filed: May 18, 2011

(65) Prior Publication Data

US 2011/0297862 A1 Dec. 8, 2011

(30) Foreign Application Priority Data

May 19, 2010 (DE) ..................... 20 2010 006 961 U

(51) Int. Cl.
*F16K 1/22* (2006.01)
*F02D 9/04* (2006.01)
*F16K 27/02* (2006.01)

(52) U.S. Cl.
CPC . *F02D 9/04* (2013.01); *F16K 1/222* (2013.01); *F16K 27/0218* (2013.01); *Y10T 29/49416* (2015.01)

(58) Field of Classification Search
CPC ....... F02D 9/04; F16K 1/222; F16K 27/0218; F16K 1/2268; F16K 1/22–1/2285; F16K 41/026; Y10T 29/49416
USPC ......................... 251/214, 305–308; 29/890.13
See application file for complete search history.

(56) References Cited

U.S. PATENT DOCUMENTS

| 1,509,430 | A | * | 9/1924 | Horsburgh | ................... | 251/142 |
| 3,111,300 | A | * | 11/1963 | Boone, Sr. | ................... | 251/306 |
| 3,498,318 | A | * | 3/1970 | Duffey | .......................... | 137/375 |
| 3,819,150 | A | * | 6/1974 | Kajrup | ..................... | 251/315.15 |
| 4,545,564 | A | * | 10/1985 | Krosoczka et al. | ...... | 251/315.03 |
| 4,546,790 | A | * | 10/1985 | Huber et al. | ............. | 137/315.19 |
| 4,589,628 | A | | 5/1986 | Barker et al. | | |
| 4,674,528 | A | * | 6/1987 | Nishio et al. | .................. | 137/375 |
| 4,800,915 | A | * | 1/1989 | Hormel | ......................... | 137/340 |
| 4,877,339 | A | * | 10/1989 | Schuster et al. | .............. | 384/218 |
| 5,374,031 | A | * | 12/1994 | Semence et al. | .............. | 251/305 |
| 5,630,571 | A | * | 5/1997 | Kipp et al. | ..................... | 251/214 |
| 5,632,304 | A | * | 5/1997 | Kempka et al. | ............... | 137/595 |
| 6,006,431 | A | * | 12/1999 | Dorner et al. | ............ | 29/890.126 |

(Continued)

FOREIGN PATENT DOCUMENTS

DE 38 02 243 8/1989
DE 38 02 243 A1 8/1989

(Continued)

*Primary Examiner* — John Bastianelli
(74) *Attorney, Agent, or Firm* — Hudak, Shunk & Farine Co. LPA

(57) ABSTRACT

A valve flap device for an exhaust system of a motor vehicle, having at least one tubular valve housing with a flow cross section running perpendicular to a central axis and being formed by the inner geometry and a shaft which can turn about a valve axis with a valve flap mounted on the shaft, being mounted in the valve housing to close the flow cross section. The valve flap device can be made with low material input and at the same time with low fabrication expense at low costs. For this, the valve housing is made from a tubular blank of sheet metal with a tube diameter that is calibrated to the flow cross section at least partially by mechanical, plastic forming.

16 Claims, 3 Drawing Sheets

(56) References Cited

U.S. PATENT DOCUMENTS

| | | | |
|---|---|---|---|
| 6,116,572 A * | 9/2000 | Schlattmann et al. | 251/193 |
| 6,916,011 B2 * | 7/2005 | Kitazawa et al. | 251/315.13 |
| 6,932,104 B2 * | 8/2005 | Anderson et al. | 137/271 |
| 7,055,547 B2 * | 6/2006 | Wang | 137/552 |
| 7,089,958 B2 * | 8/2006 | Schlosser et al. | 137/601.11 |
| 7,114,486 B2 * | 10/2006 | Hannewald et al. | 123/337 |
| 7,503,544 B2 * | 3/2009 | Unbehaun et al. | 251/308 |
| 2006/0157663 A1 * | 7/2006 | Rauch et al. | 251/305 |
| 2007/0034820 A1 * | 2/2007 | Murphy et al. | 251/148 |

FOREIGN PATENT DOCUMENTS

| | | |
|---|---|---|
| DE | 43 13 454 | 10/1994 |
| DE | 43 13 454 A1 | 10/1994 |
| DE | 94 19 537 | 3/1995 |
| DE | 94 19 537 U1 | 3/1995 |
| DE | 44 26 028 | 11/1995 |
| DE | 44 26 028 C1 | 11/1995 |
| DE | 196 43 630 | 4/1998 |
| DE | 196 43 630 A1 | 4/1998 |
| DE | 100 42 923 A1 | 3/2002 |
| DE | 102 07 060 | 8/2003 |
| DE | 102 07 060 A1 | 8/2003 |
| DE | 10 2004 032 845 | 2/2006 |
| DE | 10 2004 032 845 A1 | 2/2006 |
| DE | 10 2004 032 856 | 2/2006 |
| DE | 10 2004 032 856 A1 | 2/2006 |
| DE | 10 2004 032 974 | 2/2006 |
| DE | 10 2004 032 974 A1 | 2/2006 |
| DE | 60 2004 000 705 T2 | 5/2007 |
| DE | 20 2008 005 992 U1 | 9/2008 |
| DE | 20 2007 006 463 | 10/2008 |
| DE | 20 2007 006 463 U1 | 10/2008 |
| EP | 0 835 998 A1 | 4/1998 |
| EP | 1 887 200 A1 | 2/2008 |
| WO | 2010 108620 | 9/2010 |
| WO | WO 2010/108620 A1 | 9/2010 |

* cited by examiner

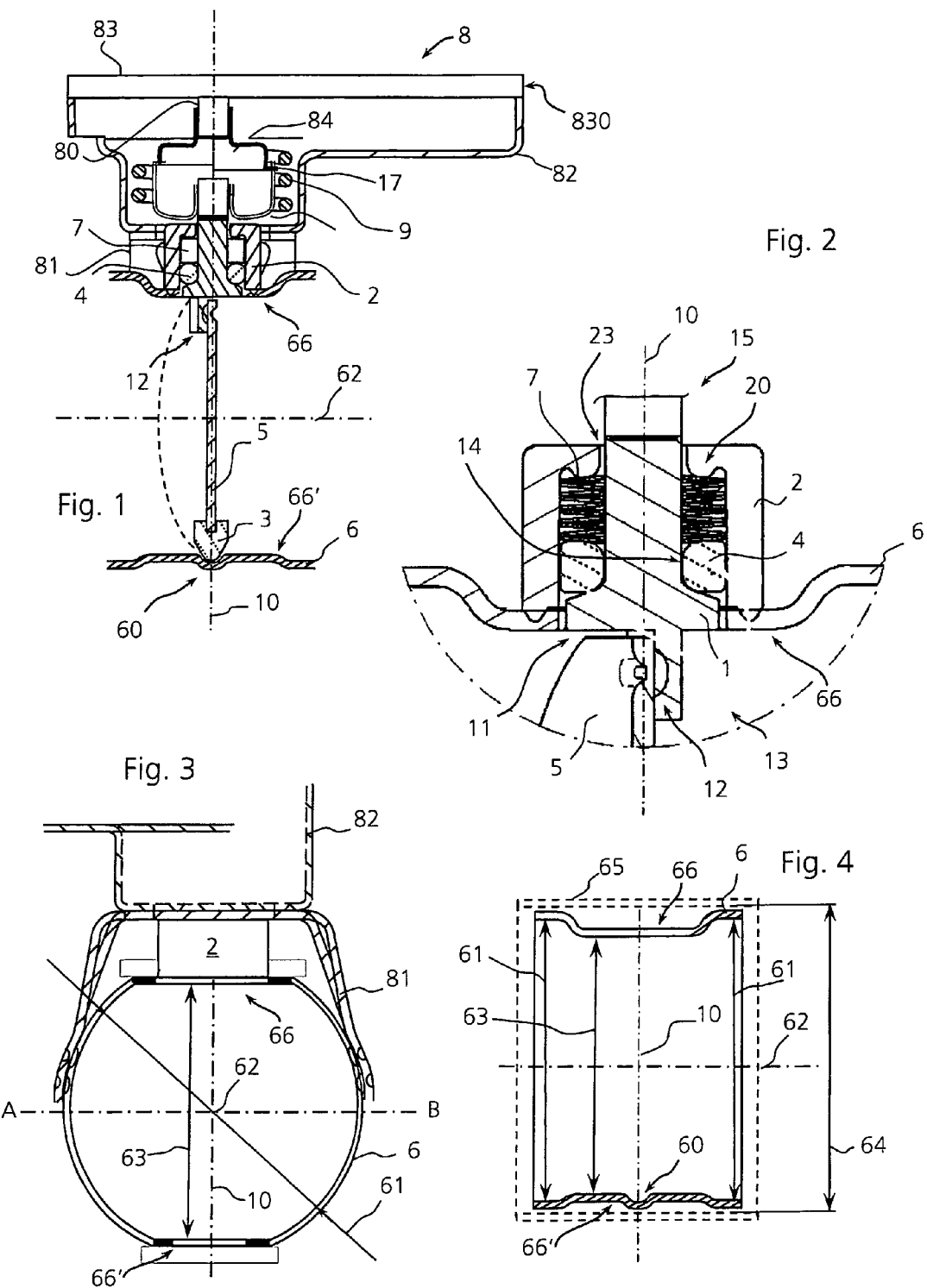

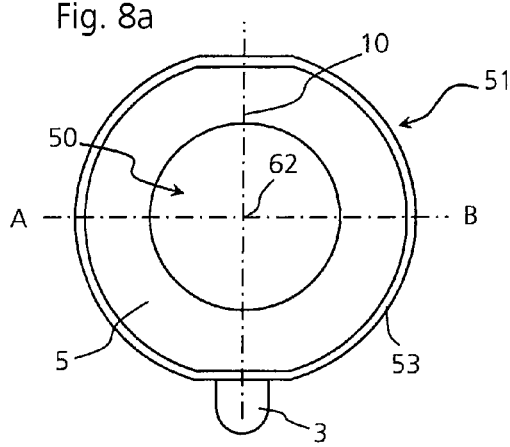
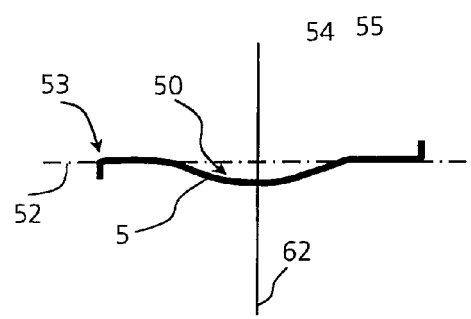
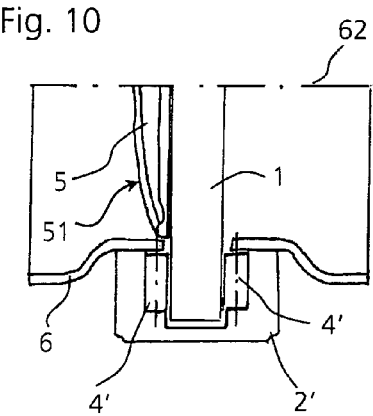
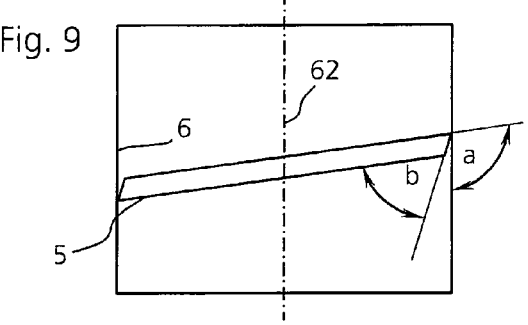
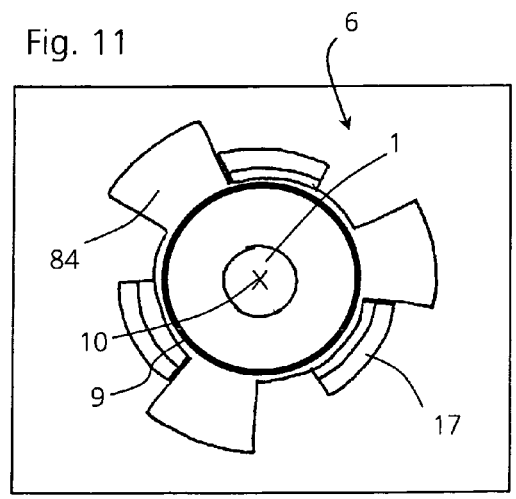

VALVE FLAP DEVICE

FIELD OF THE INVENTION

The invention relates to a valve flap device for an exhaust system of a motor vehicle, comprising at least one tubular valve housing with a flow cross section running perpendicular to a central axis and being formed by the inner geometry and a shaft which can turn about a valve axis with a valve flap mounted on the shaft, being mounted in the valve housing to close the flow cross section.

BACKGROUND OF THE INVENTION

In EP 1 887 200 A1 and in DE 60 2004 000 705 T2 are described valve flap devices with a tubular cast iron housing having valve flaps mounted by a shaft to control the flow through them.

The throttle devices described in EP 835 998 A1 and in DE 20 2008 005 992 U1 have tubular cast iron throttle housings that have been machined to produce the final geometry.

In DE 100 42 923 A1 is described a throttle mechanism in which the shaft for the valve flap is mounted on both sides and the bearing is press-fitted into the valve housing.

SUMMARY OF THE INVENTION

The basic problem of the invention is to configure and arrange a valve flap device and its fabrication method such that it can be made with low material input and at the same time with low fabrication expense at low costs.

The problem is solved according to the invention in that the valve housing is made from a tubular blank of sheet metal with a tube diameter that is calibrated to the flow cross section at least partially by mechanical, plastic forming.

The original pipe blank used for the calibration does not have the required flow cross section, at least partly or entirely, and is brought into the necessary shape by the calibration. The pipe blank, being a standard structural part, is cheap in price and the calibration is likewise a cheap method of forming, so that a simple valve housing can be made with little material expense.

At the same time, this ensures that a flexible shaping of the valve housing is achieved by various calibration, starting from the same blanks.

It may be advantageous for the calibrated inner geometry to have at least one basic inner diameter and in addition in the region of the valve flap a height reduced from the basic diameter in the direction of the valve axis, so that the pipe blank starting from the pipe diameter is decreased and/or increased to the particular dimension of the inner geometry. In this process, the pipe blank after the deformation is plastically upset or plastically stretched by the collet chucks of the calibration tool. The region of reduced height is formed as a plateau on either opposite side of the valve axis, the plateau surfaces being formed at right angles to the valve axis. The plateaus serve as bearing surface for the mounting of the shaft and the valve flap.

In regard to the bearing, the following can be advantageous: the shaft has a bearing surface for a mounting in the radial direction to the valve axis and a shaft shoulder for a mounting in the axial direction to the valve axis. A bearing housing is secured to the valve housing by form-fitting and/or material integrated bonding, in which the shaft is arranged. Moreover, a bearing element is provided to mount the shaft in the bearing housing with a sliding bearing surface for the bearing surface and with an abutting surface for the shaft shoulder, the bearing element being able to move in both axial directions in the bearing housing. A spring element is provided, by which the bearing element is biased in the axial direction against the shaft shoulder relative to the bearing housing. Such a bearing is very easy to construct, with few structural parts, but at the same time it can be statically determined with precision and is thus long-lived.

For this, it can be advantageous to secure the bearing housing to the valve housing by resistance welding or by gluing or with rivets. The use of thin-wall sheet metal according to the invention can also be realized in particular by projection welding, because in this case a small amount of heat is introduced as compared to other welding processes and thus the distortion is minimized.

In terms of a simple layout, it can be provided that the valve flap is mounted in the valve housing in the axial and in the radial direction to the valve axis by a bearing pin, the bearing pin being arranged on the valve flap relative to the shaft. This bearing can be accomplished by the above-described spring element in combination with the shaft, because the bearing pin is biased in the direction of the valve axis by the valve flap.

In terms of a simple actuation, it can be preferable to bias the shaft via a first coupling disk and a spring relative to the valve housing in the direction of an open position and it is coupled in form-fitting manner to a drive shaft by a second coupling disk disposed coaxially to the first coupling disk, wherein the two coupling disks have a play between 15° and 35° in the circumferential direction about the valve axis. The rigid separation of the drive system in circumferential direction about the valve axis is realized in this way in a manner where the two coupling disks can simply be inserted one in the other, thanks to the relatively large play, and no further adjustment of the drive connection is needed. The torque of the drive shaft for closing the valve flap in the valve housing is transmitted by the spring to the shaft, so that the drive after the closing of the valve flap could continue to turn for a few degrees without the stopping of the valve flap being transmitted to the drive shaft. An adjustment of the drive system in regard to a rigid stop in the closed position of the valve flap is thus not necessary.

The basic principle of the coupling disks thus involves a drive system in which the angular acceleration of the spring is greater than the angular acceleration of the drive shaft, so that the two coupling disks always lie against each other.

In connection with the configuration and arrangement of the invention, it may be advantageous for the valve flap to have an essentially round or oval contour adapted to the inner cross section of the valve housing and to be formed from a single or multiple-layered metal sheet, and for the valve flap to have at least one crimp and/or a curved zone in the marginal region that sticks out in at least one direction relative to a surface plane of the valve flap. Thanks to such a profiling of the valve flap, one can achieve good stiffness with very few sheet thicknesses and thereby create a geometry that behaves advantageously with respect to possible vibrations induced by the exhaust gas flow.

For this, it may be advantageous for the curved zone to have a bending edge running at least partly about the valve flap and the bending edge is fashioned as a sealing surface that can be placed against the valve housing. In this way, even with slight material thickness, one achieves a broad bearing surface of the valve flap relative to the valve housing. The valve flap in the closed position can preferably subtend an angle a of around 110° with the valve axis, while the bending edge subtends an angle b of around 55° with the valve flap, which is around 15° smaller than the difference of 180° minus angle a. In this way, the bending edge of the valve flap lies against the valve housing only in linear fashion.

Furthermore, it can be advantageous for the crimp and/or the curved zone to be fashioned in mirror symmetry to the valve axis or in point symmetry to an intersection of the central axis and the valve flap.

In terms of a simple layout, it can be advantageous for the valve flap and/or the valve housing to have a thickness between 0.6 mm and 3.0 mm.

In combination with the stabilizing profile it can be advantageous for the valve flap to have a perforation and/or an opening or for the valve flap to have a base surface smaller than the flow cross section of the valve housing. In this way, it is possible to convert, in particular, an engine with 8 cylinders to 4 cylinders and thus to a smaller exhaust gas flow.

A method for the fabrication and installation of the above described valve flap devices with the following steps can be especially advantageous:
a) bearing housing and valve housing are joined together by form-fitting and/or by material integrated bonding;
b) the spring element and the bearing element are placed on the shaft and then placed along with the shaft in the bearing housing;
c) the bearing pin is fastened to the valve flap, and the valve flap with the bearing pin is placed in the valve housing;
d) under the biasing of the spring element, the valve flap is joined to the shaft by form-fitting and/or by material integrated bonding.

The required biasing is transmitted here from the shaft to the valve flap and the bearing pin, for which the valve flap lies against the shaft in the direction of the valve axis.

In regard to the use of thin-wall sheet metal as the valve housing, and especially in order to avoid distortion, it can be advantageous for the bearing housing to be secured to the valve housing by resistance welding or by gluing or with rivets. In particular, projection welding as a special method of resistance welding enables a joining process with very little heat input, no welding spatter and no welding add material.

BRIEF DESCRIPTION OF THE DRAWINGS

Further benefits and details of the invention are explained in the patent claims and in the specification and depicted in the figures. There is shown:

FIG. 1 a representation of a valve flap device with a valve housing in a cross section parallel to a central axis with a drive device in a drive housing and a spring for coupling the shaft to a drive shaft;

FIG. 2 a detailed view of FIG. 1;

FIG. 3 a sectional view in the direction of the central axis of the drive housing and the valve housing, which are joined by a bridge housing;

FIG. 4 the valve housing fabricated from a calibrated pipe blank (shown by dotted line) in a cross section parallel to the central axis;

FIGS. 5a to 8b each a top view of the profiled valve flap, alongside of which in a sectional view is shown the course of the profile curved in the marginal region and embossed in the central region;

FIG. 9 a basic diagram of the geometry of the curved zone of the valve flap in relation to the valve housing;

FIG. 10 an alternative mounting of the valve flap with a second bearing housing;

FIG. 11 a simplified representation of two coupling disks in top view.

DETAILED DESCRIPTION OF THE INVENTION

Figure 5A:
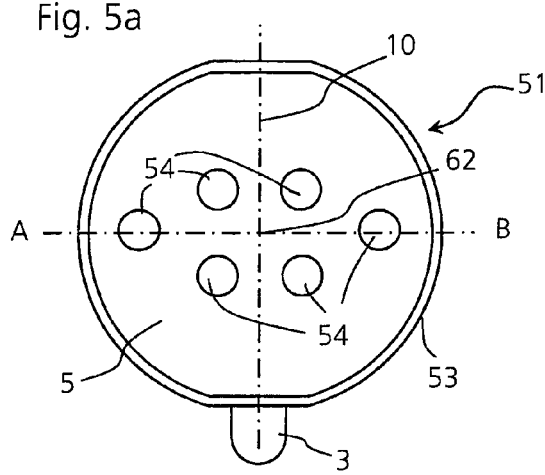

FIG. 1 shows a valve flap device with a calibrated valve housing 6, in which a shaft 1 is mounted by a bearing element 4 in a bearing housing 2, at the end 13 of which is provided a seat 12, on which a valve flap 5 is secured with a bearing pin 3. The cross section runs parallel to the valve housing 6, i.e., in the direction of flow of the medium toward the central axis 62. The valve flap 5 turns about a valve axis 10 in a turning range of up to 90 degrees. At an end 15 of the shaft which is opposite in the direction of the valve axis 10, the shaft 1 is connected to a drive shaft 80.

As shown more closely in FIG. 2, the shaft 1 has a bearing surface 14, by which the shaft 1 is mounted so as to turn about the valve axis 10 in the radial direction to the valve axis 10. For the mounting, a separate bearing element 4 is provided in the form of a sliding bearing bushing, which is mounted in the bearing housing 2 and entirely surround the circumference of the shaft 1 with the sliding bearing surface.

If order for the bearing element 4 and thus also the shaft 1 to be biased, the bearing element 4 is pressed or biased by a spring element 7 fashioned as a pack of plate springs in a direction parallel to the valve axis 10 against a shaft shoulder 11. This biasing is transmitted by the shaft 1 to the valve flap 5 and by the bearing pin 3. The bearing element 4 and the bearing pin 3 produce a two-point bearing in this way, which absorbs radial and axial forces in relation to the valve axis 10. For this, the valve housing 6 has a recess 60 in which the bearing pin 3 is mounted, as also shown in FIG. 4.

In order to ensure the required biasing of the bearing element 4, the bearing element 4 is mounted so that it can move in the axial direction in the bearing housing 2. In the direction of the shaft shoulder 11, the bearing element 4 lies by its abutment surface against the shaft 1. But in order to achieve a defined mounting, the bearing element 4 is secured against twisting about the valve axis 10 in the bearing housing 2 by form fitting, so that no significant relative movement can occur in the circumferential direction between the bearing element 4 and the bearing housing 2.

The bearing housing 2 has a shoulder 20, against which the plate spring pack 7 lies in the axial direction, i.e., in a direction parallel to the valve axis 10. The shoulder 20 is diminished relative to the inner diameter of the bearing housing 2 and at the same time forms a housing opening 23, through which the upper end 15 of the shaft 1 is led in the direction of a driving device 8.

In FIGS. 3 and 4 the calibrated valve housing 6 is shown more closely. Starting with a pipe blank 65, as shown by dotted line in FIG. 4, the pipe blank 65 is brought to the necessary dimensions for the valve housing 6 by calibration, i.e., by a plastic reduction of its diameter. The required inner dimensions are a base diameter 61 at the two end faces and a height 63 between the two plateaus 66, 66', which are likewise calibrated. The above-described bearing housing 2 is fastened on the upper plateau 66. Additionally, a recess 60 for the bearing pin 3 is calibrated in the lower plateau 66'.

The drive device 8 shown in FIG. 1 comprises, besides the drive shaft 80, which is connected by a spring 9 to the shaft 1 in a way elastic to rotation, a bridge housing 81, shown more closely in FIG. 3, by which the valve housing 6 is joined to a drive housing 82. The drive housing 82 is closed at the top by a housing cover 83, which has a seat 830 for a power supply. The bridge housing 81 is placed on the valve housing 6, shown more closely in FIG. 3.

The shaft 1 is driven by the drive shaft 80 of a motor (not shown). For a biasing of the valve flap 5 in the circumferential direction about the valve axis 10, a spring 9 and two coupling disks 17, 84 are provided according to FIG. 1. The shaft 1 is biased by the spring 9 and the first coupling disk 17 in the valve housing 6 in a way such that the spring would turn the valve flap 5 to the closed position if the shaft 1 were not driven to open by the drive shaft 80. The second coupling disk 84 is connected to the drive shaft 80 so that the torque is transmitted from the drive shaft 80 via the second coupling disk 84 and the first coupling disk 17 to the shaft 1. The two coupling disks 17, 84 are divided into three segments in the circumferential direction, which intermesh with each other, as shown in FIG. 11. A play of several degrees is provided between the individual segments in the circumferential direction, so that the two coupling disks 17, 84 can easily intermesh in the direction of the valve axis 10.

In FIGS. 5a to 8b different valve flaps 5 are shown in a front view, having an essentially round or oval contour adapted to the inner cross section of the valve housing 6 with different base surfaces. Fig. a left shows the top view of the valve flap 5 and Fig. b right a sectional view AB per Fig. a. The valve flap 5 has various crimps 50 to increase the stability and therefore, due to increased stiffness, also improve the tightness relative to the valve housing 6 per FIGS. 6a to 8b, which stick out relative to a surface plane 52 of the valve flap 5 in the direction of the central axis 62. This profiling in the form of crimps increases the stiffness and allows for thinner sheet metal for the valve flap 5.

In all sample embodiments, curved zones 51 are provided in the margin region, which stick out relative to the surface plane 52 of the valve flap 5 in the direction of the center axis 62. The particular curved zone 51 has a bending edge 53 running at least partly about the valve flap 5, which is designed as a sealing surface and can be placed against the valve housing 6.

Figure 5B:
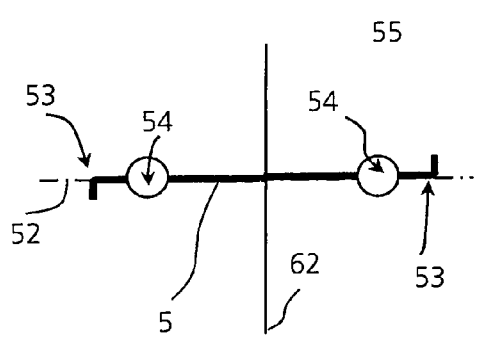
Figure 6A:
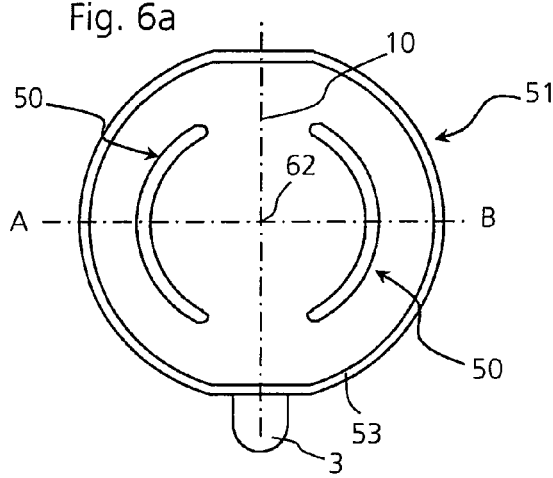
Figure 6B:
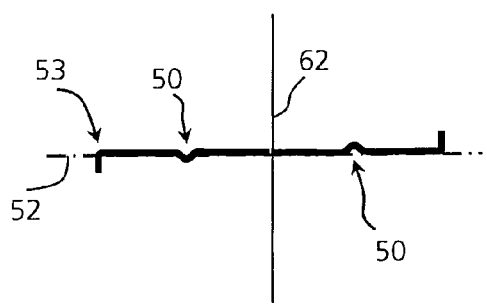

The curved zone 51 according to FIGS. 5b, 6b and 8b alternately runs in both directions around the center axis 62 or is alternately curved so that the valve flap 5 is sealed on both sides with the corresponding sealing surface. The crimps 50 are also differently oriented so that the valve flap 5 is fashioned with point symmetry relative to the intersection of the center axis 62 and the valve flap 5.

Figure 7A:
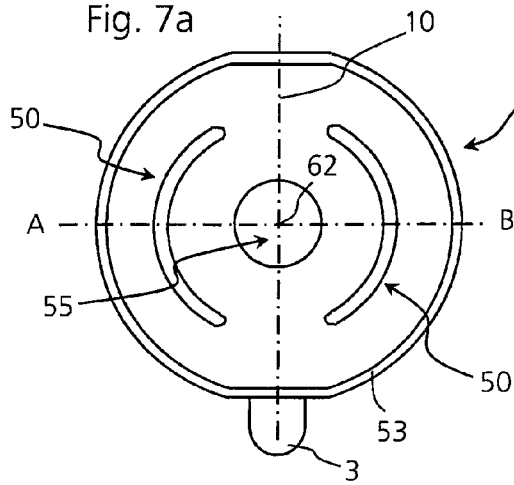
Figure 7B:
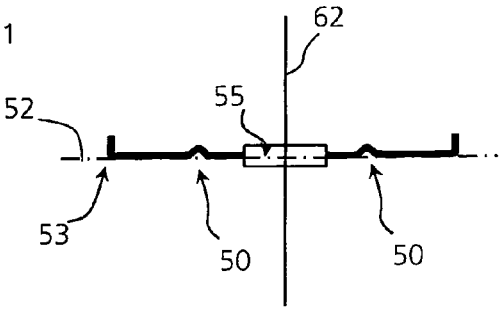

According to FIG. 7b, the curved zone 51 as well as the crimp 50 protrude in the same direction of the center axis 62, so that the valve flap 5 is configured with mirror symmetry relative to the center axis 62.

FIG. 10 shows a bearing variant without a bearing pin 3, in which the shaft 1 is mounted by a second bearing element 4' and a second bearing housing 2'. The valve flap 5 here is secured to the valve flap 5, and a curved zone 51 is also provided here. The lower second bearing housing 2' is placed on the lower plateau 66' and joined to the latter.

What is claimed is:

1. A valve flap device for an exhaust system of a motor vehicle, comprising:
   a) at least one tubular valve housing with a flow cross section running perpendicular to a central axis and being formed by an inner geometry and
   b) a shaft which can turn about a valve axis with a valve flap mounted on the shaft, being mounted in the valve housing in the flow cross section to close the flow cross section,
   wherein the valve housing is made from a tubular pipe blank of sheet metal with a tube diameter that is calibrated to the flow cross section at least partially by mechanical, plastic forming, and
   wherein the shaft is biased via a first coupling disk and a spring relative to the valve housing in the direction of an open position and the shaft is coupled in form-fitting manner to a drive shaft by a second coupling disk disposed coaxially to the first coupling disk, wherein the two coupling disks have a play between 15° and 35° in a circumferential direction about the valve axis.

2. The valve flap device according to claim 1, wherein the calibrated inner geometry of the flow cross section has at least one basic inner diameter and in addition in the region of the valve flap a height of the flow cross section is reduced from the basic inner diameter in the direction of the valve axis, so that the pipe blank starting from the tube diameter is decreased and/or increased to the particular dimension of the inner geometry.

3. The valve flap device according to claim 1, wherein
   a) the shaft has a bearing surface for a mounting in a radial direction to the valve axis and a shaft shoulder for a mounting in an axial direction to the valve axis,
   b) a bearing housing is secured to the valve housing by form-fitting and/or bonding, in which the shaft is arranged,
   c) a bearing element is provided to mount the shaft in the bearing housing with a sliding bearing surface for the bearing surface and with an abutting surface for the shaft shoulder, the bearing element being able to move in both axial directions in the bearing housing, and
   d) a spring element is provided, by which the bearing element is biased in the axial direction against the shaft shoulder relative to the bearing housing.

4. The valve flap device according to claim 3, wherein the bearing housing is secured to the valve housing by resistance welding or by gluing or with rivets.

5. The valve flap device according to claim 4, wherein the valve flap is mounted in the valve housing in the axial and in the radial direction to the valve axis by a bearing pin, the bearing pin being arranged on the valve flap relative to the shaft.

6. The valve flap device according to claim 1, wherein an angular acceleration of the spring is greater than an angular acceleration of the drive shaft.

7. The valve flap device according to claim 1, wherein
   a) the valve flap has an essentially round or oval contour adapted to the inner cross section of the valve housing and is formed from a single or multiple-layered metal sheet, and
   b) the valve flap has at least one crimp and/or a curved zone in a marginal region that sticks out in at least one direction relative to a surface plane of the valve flap.

8. The valve flap device according to claim 7, wherein the curved zone has a bending edge running at least partly about the valve flap and the bending edge is fashioned as a sealing surface that can be placed against the valve housing.

9. The valve flap device according to claim 7, wherein the crimp and/or the curved zone is fashioned in mirror symmetry to the valve axis or in point symmetry to an intersection of the central axis and the valve flap.

10. The valve flap device according to claim 1, wherein the valve flap and/or the valve housing has a thickness between 0.6 mm and 3.0 mm.

11. The valve flap device according to claim 8, wherein the valve flap has a perforation and/or an opening or the valve flap has a base surface smaller than the flow cross section of the valve housing.

12. A system consisting of a valve flap device according to claim 1 and an exhaust system for an internal combustion engine or for a motor vehicle.

13. The valve flap device according to claim 2, wherein
   a) the shaft has a bearing surface for a mounting in a radial direction to the valve axis and a shaft shoulder for a mounting in an axial direction to the valve axis,
   b) a bearing housing is secured to the valve housing by form-fitting and/or material integrated bonding, in which the shaft is arranged, c) a bearing element is provided to mount the shaft in the bearing housing with a sliding bearing surface for the bearing surface and with an abutting surface for the shaft shoulder, the bearing element being able to move in both axial directions in the bearing housing, and d) a spring element is provided, by which the bearing element is biased in the axial direction against the shaft shoulder relative to the bearing housing.

14. A valve flap device for an exhaust system of a motor vehicle, comprising: a) at least one tubular valve housing with a flow cross section running perpendicular to a central axis and being formed by an inner geometry and b) a shaft which can turn about a valve axis with a valve flap mounted on the shaft, being mounted in the valve housing in the flow cross section to close the flow cross section, wherein the valve housing is made from a tubular pipe blank of sheet metal with a tube diameter that is calibrated to the flow cross section at least partially by mechanical, plastic forming, wherein the calibrated inner geometry of the flow cross section has at least one basic inner diameter and in addition in the region of the valve flap a height of the flow cross section is reduced from the basic inner diameter in the direction of the valve axis, so that the pipe blank starting from the tube diameter is decreased and/or increased to the particular dimension of the inner geometry, wherein a) the shaft has a bearing surface for a mounting in a radial direction to the valve axis and a shaft shoulder for a mounting in an axial direction to the valve axis, b) a bearing housing is secured to the valve housing by form-fitting and/or material integrated bonding, in which the shaft is arranged, c) a bearing element is provided to mount the shaft in the bearing housing with a sliding bearing surface for the bearing surface and with an abutting surface for the shaft shoulder, the bearing element being able to move in both axial directions in the bearing housing, and d) a spring element is provided, by which the bearing element is biased in the axial direction against the shaft shoulder relative to the bearing housing, and wherein the bearing housing is secured to the valve housing by resistance welding or by gluing or with rivets, wherein the valve flap is mounted in the valve housing in the axial and in the radial direction to the valve axis by a bearing pin, the bearing pin being arranged on the valve flap relative to the shaft, wherein the shaft is biased via a first coupling disk and a spring relative to the valve housing in the direction of an open position and the shaft is coupled in form-fitting manner to a drive shaft by a second coupling disk disposed coaxially to the first coupling disk, and wherein the two coupling disks have a play between 15° and 35° in a circumferential direction about the valve axis.

15. The valve flap device according to claim 14, wherein an angular acceleration of the spring is greater than an angular acceleration of the drive shaft, wherein a) the valve flap has an essentially round or oval contour adapted to the inner cross section of the valve housing and is formed from a single or multiple-layered metal sheet, and b) the valve flap has at least one crimp and/or a curved zone in a marginal region that sticks out in at least one direction relative to a surface plane of the valve flap, wherein the curved zone has a bending edge running at least partly about the valve flap and the bending edge is fashioned as a sealing surface that can be placed against the valve housing, and wherein the crimp and/or the curved zone is fashioned in mirror symmetry to the valve axis or in point symmetry to an intersection of the central axis and the valve flap.

16. The valve flap device according to claim 15, wherein the valve flap and/or the valve housing has a thickness between 0.6 mm and 3.0 mm, and wherein the valve flap has a perforation and/or an opening or the valve flap has a base surface smaller than the flow cross section of the valve housing.

\* \* \* \* \*